(12) United States Patent
McKinney et al.

(10) Patent No.: US 6,330,373 B1
(45) Date of Patent: Dec. 11, 2001

(54) REAL-TIME DETAILED SCENE CONVOLVER

(75) Inventors: Dennis G. McKinney; Bruce M. Heydlauff; John D. Channer, all of Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/267,912

(22) Filed: Mar. 5, 1999

(51) Int. Cl.$^7$ ........................................................ G06K 9/64
(52) U.S. Cl. .................... 382/279; 708/420; 708/315; 702/20; 382/103
(58) Field of Search ..................................... 382/279, 282, 382/291, 103; 345/137; 708/420, 315, 5; 703/20, 27

(56) References Cited

U.S. PATENT DOCUMENTS

| | | | |
|---|---|---|---|
| 4,991,020 | * | 2/1991 | Zwirn .................................. 358/160 |
| 5,610,848 | * | 3/1997 | Fowell ............................. 364/724.07 |

* cited by examiner

*Primary Examiner*—Leo Boudreau
*Assistant Examiner*—Yosef Kassa
(74) *Attorney, Agent, or Firm*—Earl H. Baugher, Jr.; Anthony N. Serventi; Greg M. Bokar

(57) ABSTRACT

Provided is a system, and general method of use that may be applied to the specific system, that overlays appropriately selected impulse response maps of the response of a weapon system's optical detector over successive detailed supercomputer-generated imaged scenes. Each of the impulse response maps have been pre-calculated and stored in addressable memory in preparation for running a simulation. A preferred embodiment then convolves the response maps with the appropriately selected imaged scene in cooperation with a gyro model and, optionally, a model of the airframe on which the detector is carried. Errors determined from the gyro model are used to calculate and provide an address offset to modify values of the response map's base address for the appropriate map pixels. Scene pixel values that undergo convolution are selected using portions of these modified base address values. A pixel's intensity value from the impulse response map is selected by using these changed base address values prior to convolution as well as the position information from the gyro model. During the convolution, the intensity values assigned to the selected scene pixels' are multiplied by those values from the appropriate impulse response map. This generates resultant values that are summed to produce a final convolved representation, or convolved image, that may be further processed by a digital-to-analog converter to output an analog signal of voltage versus time. This analog signal may be filtered to reduce any associated noise. A preferred embodiment generates a realistic simulation of dynamically changing scenes as viewed by an actual system's optical detector in real time. The simulation may be presented to an actual weapon system's signal processing circuitry for performance evaluation of that circuitry.

27 Claims, 2 Drawing Sheets

REAL-TIME DETAILED SCENE CONVOLVER

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND OF THE INVENTION

1. Field of the Invention

The present invention pertains generally to scene simulation systems and methods, and more particularly to a real time detailed scene convolver system. The system allows matching of complex imaged scenes to weapon system optics to generate a realistic detailed response that may be presented to weapon signal processing electronics for testing.

2. Background

Various weapon systems have been developed that employ advanced high resolution electro-optical/infrared (EO/IR) raster-scan image-based seeker systems. These image-based weapon systems typically utilize advanced signal processing algorithms to increase the probability of target detection and target recognition, with the ultimate goal of accurate target tracking and precise aim-point selection for maximum probability of kill and minimum collateral damage. Validation of such signal processing algorithms has traditionally been carried out through free flight, captive carry and static field tests of the image-based weapon systems, followed by lab analysis, modification of the algorithms, and then subsequent field tests followed by further analysis and modifications. This process is generally costly and time-intensive. Obtaining the correct target and weather conditions can add additional cost and time delay to this test/modify/re-test cycle and is of no use in a simulated or "virtual" environment.

Recently, the development and testing of signal processing algorithms for EO/IR image-based weapon system electronics has been facilitated by the creation of digital video-based detailed scene injection (DSI). This technique allows realistic testing of image-based weapon system signal processing in the loop (SPIL) electronics in a laboratory environment with complex flight path, target, and weather condition scenarios. Detailed scene injection provides for the use of spatially, temporally and spectrally correct images rendered using a video-generating computer, such as the Silicon Graphics ONYX II Supercomputer. These images can then be delivered to the signal processing electronics of an image-based raster-scanned weapon system for dynamic "real-time" testing.

The use of digital video injection has been limited to imaging weapon systems that employ raster scanning. However, many weapon systems employ EO/IR detectors with scanning techniques other than raster scan, such as frequency modulated (FM) conically-scanned reticle, amplitude modulated (AM) center (or outer-nulled) spin-scanned reticle and rosette-scanned detectors. With systems employing these non-raster scanning detectors, digital video injection cannot provide a sufficiently high-resolution, pre-stored, complex image in "real-time" to present to the signal processing electronics for processing and system testing.

Accordingly, there is a need for a real time detailed scene convolver system and method that can be used with detectors that employ other than raster scanning, and that generates correct, complex, detailed output in real time. A preferred embodiment of the present invention satisfies these needs, as well as others, and generally overcomes the deficiencies found in the background art.

SUMMARY OF THE INVENTION

A preferred embodiment of the present invention provides a system and method that captures realistic detailed responses of a weapon system's optical detector for transfer to that weapon's signal processing electronics in real time. A preferred embodiment of the present invention interfaces with a graphics supercomputer that generates a "virtual" or synthetic scene. A preferred embodiment of the present invention utilizes a "map" of an impulse response signal that simulates the actual signal that would be provided by a weapon system's optical detector's response (consisting of a reticle and "raw" optics signal processing circuitry only, hereinafter detector) to a point source, i.e., a sub-diffraction limit sized source. This response map is over-laid, or superimposed, on the imaged scene provided by the graphics supercomputer so that a representation of where the imaged scene's pixels are actually striking the detector is provided. The imaged scene is comprised of pixels hereinafter identified as scene pixels. A value associated with the intensity of each scene pixel "striking" or "hitting" within a "response region" of the map is multiplied by a value assigned to each pixel resident on the map, i.e., a map pixel, that is associated with that map pixel's intensity and the selection of which map pixel to multiply is determined, at least in part by the map pixel's location on the map. These individual products are summed to provide a single overall detector response value, or image, for a response region within the imaged scene. The process is facilitated for simulation in real time by pre-calculating detector responses and storing them in look-up tables or other suitable addressable memory. In general terms, a preferred embodiment of the present invention:

generates a map as a configuration of pixels representing a detector's response signal that may be sub-divided into sections sized to accommodate a desired resolution, i.e., the addressable sections may be composed of small addressable sub-categories, often termed cells, or may be further sub-divided into addressable sub-cells to achieve enhanced resolution;

populates addressable memory, e.g., an X-Y look-up table, with numerical values representing predetermined addresses of the centers of each of the smallest addressable divisions (e.g., sub-cells) of maps of a detector's response to the imaged scenes that will be used in a planned simulation, as determined from a reference-based position;

receives a computer-generated complex imaged scene; generates modified base addresses for selected pixels from the detector response maps;

selects base addresses from the complex imaged scene and the modified base addresses, where the base addresses may be modified as a result of an input from a gyro model;

generates a detector response output using the modified base addresses, the selected base addresses, and the complex imaged scene;

directs the detector response output to an external interface; and moves the map of the detector's response signal over the complex imaged scene in real time, thereby "flying" the system in the lab to simulate an actual system in flight.

More specifically, the output generated by a preferred embodiment of the present invention replaces the output from the detector of a weapon to allow simulated operation of that weapon in a synthesized scenario. A preferred embodiment of the present invention uses an actual threat signal processor-in-the-loop (T-SPIL) with detailed scene injection (DSI) in a realistic simulation of multiple types of scanning detectors incorporated in weapon systems. A preferred embodiment of the present invention incorporates surface-to-air, air-to-surface or air-to-air threat weapon signal processors (including tracker, counter-countermeasure and guidance circuitry). These processors are coupled with the generation and injection of detailed imaged scenes to create a realistic threat analysis capability that simulates actual weapons in free flight. The T-SPIL processes inputs from processors that are linked to digital models of a weapon system's detectors, as well as a model of the weapon system's gyros and, optionally, its airframe. The combination of inputs produces a highly realistic and credible simulation of the weapon system's responses during dynamic simulations of realistic scenarios. The DSI provides the system with composite computer-generated detailed imaged scenes (>16,000 pixels) that may include targets, countermeasures and backgrounds.

The advantages of using T-SPIL in combination with DSI simulation include:

generating the realistic free flight of a weapon while using actual weapon signal processors;

operating in real time;

providing fully detailed targets, countermeasures and backgrounds;

facilitating dynamic behavior of all objects in an imaged scene;

simulating realistic weapon end-game performance;

operating simultaneously in multiple spectral bands; and providing a realistic simulation of a live firing of an actual production system whose parameters may not be fully known.

In a preferred embodiment of the present invention, major components that may be used are:

a real time detailed scene convolver comprising:
dual port video memory (DPVM),
at least one processor,
an address generator comprising a look-up table, a counter, an X-adder and a Y-adder, and
a detector response memory;

a scene generation supercomputer;

scene generation software;

signal processor hardware to include an actual threat signal processor from a production weapon system;

a digital airframe model; and a digital gyro model.

A preferred embodiment of the present invention provides a real-time detailed scene convolver that performs a real-time convolution on a detailed imaged scene provided as a digital video image for further use in simulation, testing and evaluation of the performance of a weapon system that may have at least a portion of its guidance provided by an optical detector.

In a preferred method, a dynamically changing detailed scene is captured from a graphics supercomputer as a digital video image. In a preferred embodiment of this invention, a response mapping of the response of the system's detector to a point source target is calculated off line and is convolved with the simulated digital image, in real time. This results in the generation of a simulated weapon system response signal that may be provided as a realistic representation of the response signal that would be available from an actual flight of a weapon system as generated through inputs provided by its optical detector. The convolution is performed by pre-generating and storing in memory a detector impulse response mask (or map, hereinafter map) and convolving this map with the imaged scene. For evaluation and testing, this convolved output is then sent to the weapon system's actual signal processors, not a simulation or special test setup.

The map of the detector's response signal is partitioned into segments and these are stored in memory. A preferred embodiment of the present invention includes a dual port video memory (DPVM) in which the detailed imaged scene is stored for subsequent convolution with the response map of the weapon's detector. The DPVM provides the pixels of the imaged scene that are currently striking that segment of the map to a processor that generates a simulated response signal that is representative of that provided by an actual weapon system's detector. Only the detector response is simulated. All "down line" processing from the detector is done by an actual production version of the weapon system's signal processing circuitry. The DPVM may be provided with the digital video image for the predicted next map location while the current imaged scene is being processed, essentially taking advantage of the "dual porting" function of the DVPM.

An address generator, alternatively termed data slicer, hereinafter address generator, generates modified base addresses for each pixel comprising the map, performing this for each response region of the map. It obtains response map values for base address locations for each imaged scene pixel where the imaged scene "hits" the pre-calculated response map. It parses these values into an integer value and a fractional value. The address generator further modifies the base address locations using a tracking error value, termed an address offset, supplied by a gyro model. The integer part of each map pixel's address value as modified by the input of error data from the gyro model 30 is communicated to the DPVM where it is used to fetch the appropriate scene pixel from memory.

The processor that convolves the scene pixels from the DVPM with the pre-calculated detector response addressable from the detector response memory generates an updated and corrected real-time detector response resultant from multiplying values representing pre-calculated centers of the smallest divisions of the stored response map, as identified by a fractional value provided by the X-Adder and Y-Adder to the detector response memory, by a corresponding value representing the intensity for each scene pixel as identified by the selected imaged scene base addresses. The individual products are summed to provide signals for generating the image as "seen" by the detector. This output is used in a dynamic simulation for evaluating an actual weapon system detector's down line signal processors.

In operating a preferred embodiment of the present invention, the weapon system's detector response is overlaid as a mask (or map) on the imaged scene. Using the output of the address generator, only certain scene pixels, i.e., those determined to be striking the detector at that time of its scan, are selected to be convolved and sent to the one or more processors managing the convolution. While this is occurring, the map of the detector response signal is being moved over the imaged scene in real time. Concurrently, the detector response signal is directed to an output interface and ma y be sent to an actual weapon system's down line signal processors for evaluation and testing. Thus, a simulation of a detector's response signal may be used to evaluate an actual weapon system detector's response that is input to an actual weapon system's signal processing circuitry.

The convolution process is accomplished by:

fetching a digital video image of a scene from a suitable source;

overlaying a pre-calculated map of a detector's response on the image;

convolving the image with the map of a detector's response such that selected values of scene pixel intensity are multiplied by values assigned to pixels within the map representing signal responses for a corresponding response region of the map;

summing the resultant individual products to obtain a convolved image for the response region; and moving the map of the response signal over the image in real time while repeating the algorithm for processing of a next image thus yielding a dynamic Simulation.

An object of the invention is to provide a real-time detailed scene convolution system and method for testing reticle-based guided weapon systems.

Another object of the invention is to provide a real-time detailed scene convolution system and method that can be used with scanning techniques in addition to raster scanning.

Another object of the invention is to provide a real-time detailed scene convolution system and method that generates correct, complex, output in real-time for testing.

Another object of the invention is to provide a real-time detailed scene convolution system and method that renders realistic dynamics.

Another object of the invention is to provide a real-time detailed scene convolution system and method that utilizes fully detailed targets, countermeasures and backgrounds.

Another object of the invention is to utilize a real-time detailed scene convolution system and method that portrays realistic dynamic behavior of all objects within a scene.

Another object of the invention is to provide a real-time detailed scene convolution system and method that renders realistic simulation of end-game performance.

Another object of the invention is to provide a real-time detailed scene convolution system and method that simultaneously utilizes imaged scenes generated within multiple spectral bands.

Another object of the invention is to provide a real-time detailed scene convolution system and method for a simulation representative of actual operation of the weapon system.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

A preferred embodiment of the present invention may be understood by reference to the following drawings, which are for illustrative purposes only.

DETAILED DESCRIPTION

Figure 1:
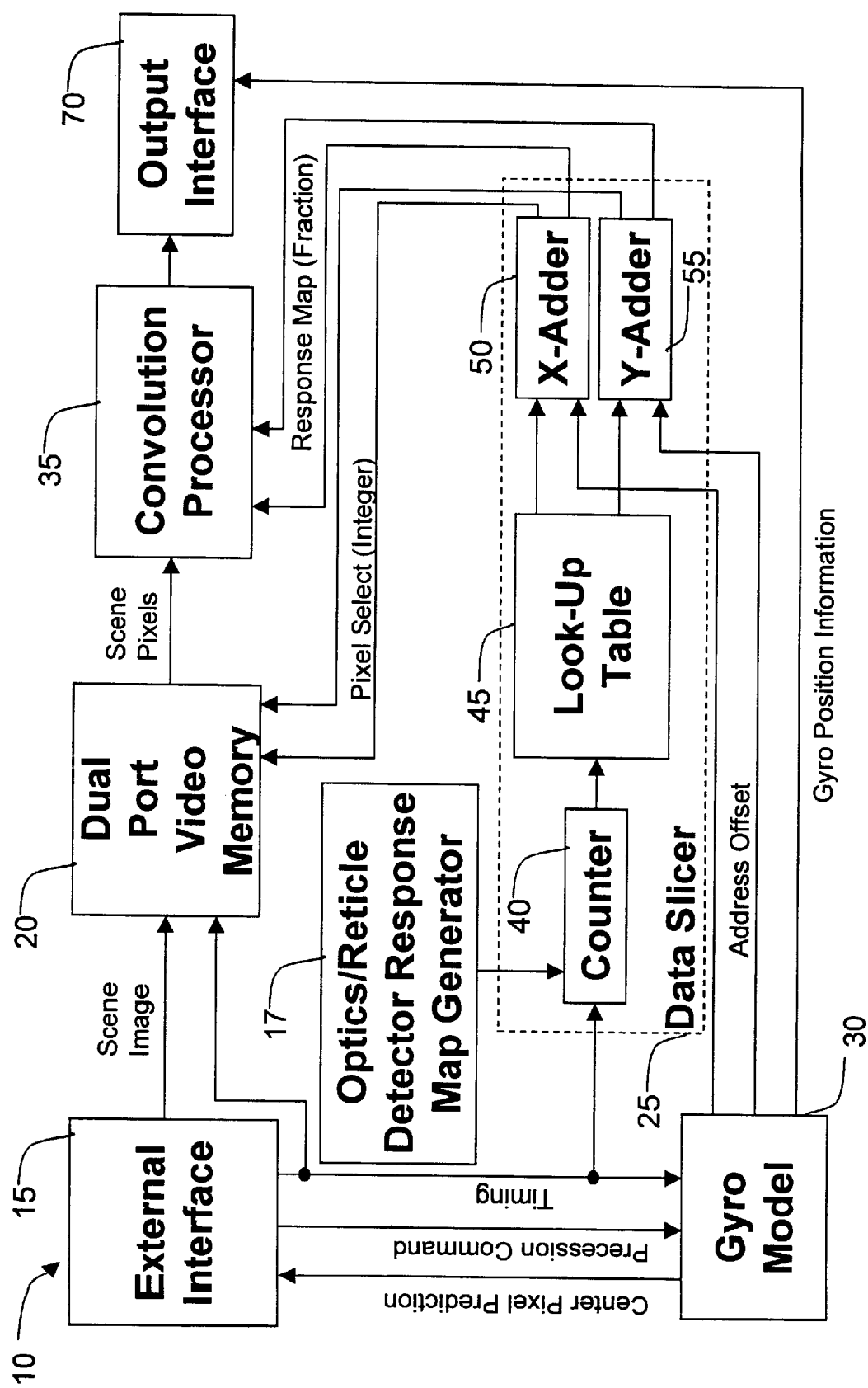
FIG. 1 is a functional block diagram of a real-time detailed scene convolution system in accordance with a preferred embodiment of the present invention.
Figure 2:
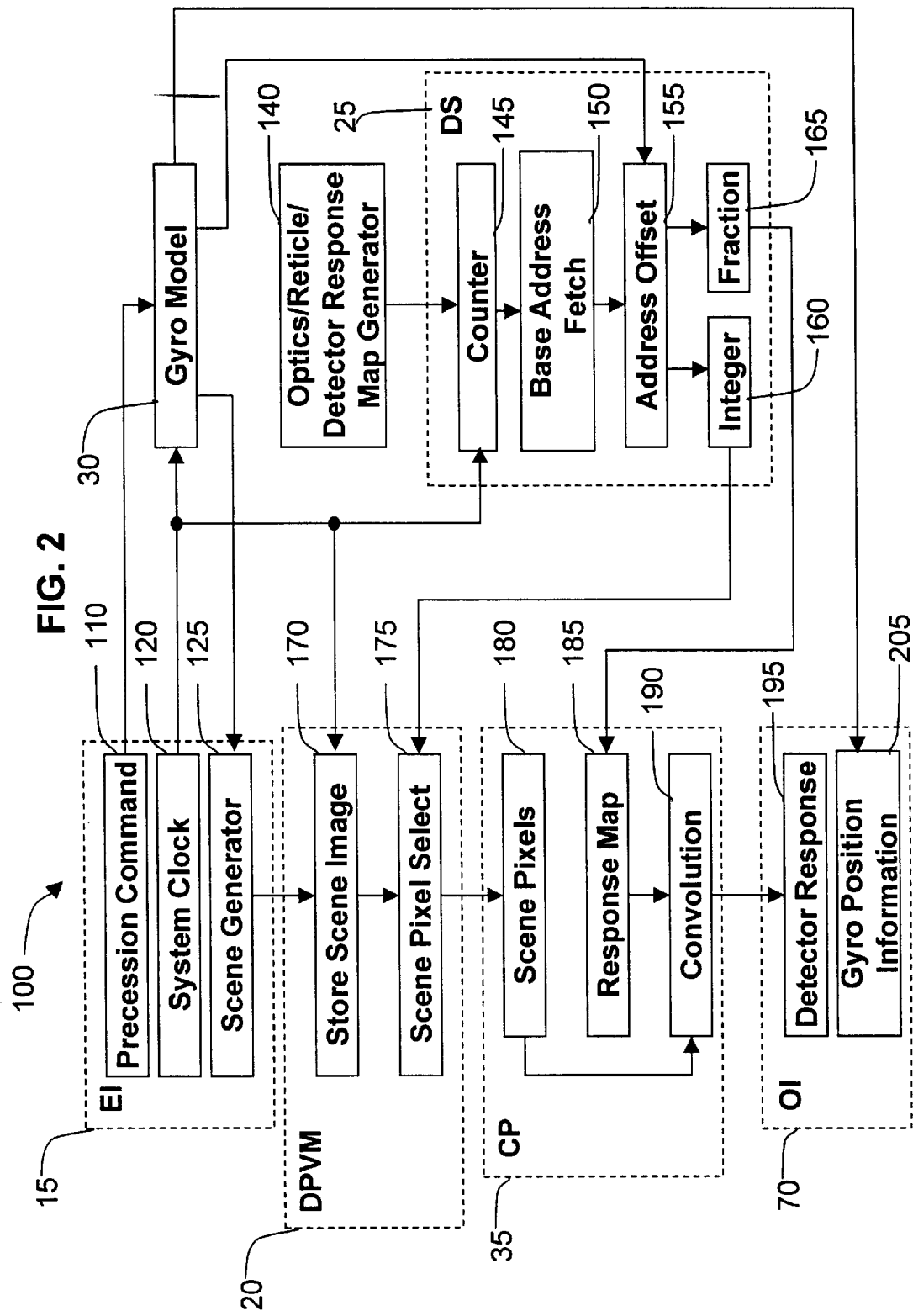
FIG. 2 depicts a preferred method of the present invention: generating response maps of the responses of a weapon system's detector signal; overlaying appropriate ones of the response maps upon separately provided digital video images of detailed dynamically changing scenes, and convolving each of the resulting "matches" which may then be converted to an analog signal of voltage vs. time to yield a dynamic simulation of a typical weapon system's performance on a specific mission.

Referring more specifically to the drawings, for illustrative purposes the present invention is generally shown in the system shown in FIG. 1 and the method shown generally in FIG. 2. It will be appreciated that the system may vary as to configuration and as to details of the parts, and the method of using the system may vary as to details and as to the order of steps, without departing from the basic concepts as disclosed herein.

The invention is disclosed generally in terms of scene and detector response simulation systems and methods that are presented to an actual weapon's signal processing circuitry for performing evaluation of that circuitry. A simulation may be accomplished for detectors employing scanning techniques other than raster, although a preferred embodiment of the present invention also may be used with simulations of raster-scanning, systems. Many advanced EO/IR guided weapon systems utilize scanning techniques other than raster scanning, such as frequency modulated (FM) conically-scanned reticle, amplitude modulated (AM) center (or outer-nulled) spin-scanned reticle and rosette-scanned detectors. It will be readily apparent to those skilled in the art that simulations of dynamically changing detailed scene and responses of the various detector systems and methods described in this invention may be used in applications simulating non-raster scanning techniques including, but not limited to, techniques used by FM conically-scanned reticle, AM center spin-scanned reticle and rosette scanned detectors.

Referring first to FIG. 1, there is shown a functional block diagram of a hardware configuration for a real-time detailed scene convolution system 10 in accordance with a preferred embodiment of the present invention. The system 10 is associated with a scene generation super-computer, scene generation software, related signal processor hardware, and a digital airframe. (all not separately shown). The real time detailed scene convolution system 10 includes an external interface (EI) 15 to provide access to signals incorporating images of scenes, timing signals, and precession commands. For example, the external interface 15 transfers some of these signals from a super-computer using scene generation software. In a preferred embodiment, the external interface 15 transfers digital video images of scenes to the dual port video memory (DPVM) 20. Each image is comprised of a number of pixels, with each scene pixel having a base address and a value assigned representing its intensity. Additionally, the external interface 15 transfers timing data corresponding to the time the individual images were supplied. It transmits this timing data to the DPVM 20, an address generator (AG) 25, at least one processor 35, and a gyro model 30 thus, time-synchronizing system operations. In addition, the external interface 15 also communicates precession commands to the gyro model 30, where they are processed and a prediction of the initial coordinates of the center pixel of each image generated and sent via the external interface to the DPVM 20.

A map generator 17 generates maps, of a weapon system detector's response signals "off line." It does this by calculating the amplitude of the impulse response of a specific detector to a detailed imaged scene for each of the smallest addressable divisions into which sections or segments of the response map is divided, e.g., sub-cells. These response signals "modulate" or "translate" the imaged scene to provide for simulation what a specific detector "sees" (as opposed to a generic detector) in viewing the selected dynamically changing imaged scenes stored in the DPVM 20 when provided by the super computer. These response signals are stored in the detector response memory 90 to later be retrieved selectively as response values for overlaying on specifically identified imaged scenes. The map generator 17 also pre-calculates, from a reference-based position of an imaged scene, the response map addresses of the smallest sub-divisions of the map as related to the imaged scenes to be run for the simulation. That is, it determines the addresses of the positions where the corresponding smallest divisions (e.g., sub-cells) of a map of a particular detector's response strike the imaged scenes to be used in a simulation. This is pre-stored in addressable memory, such as the look-up table 45. Each segment down to a smallest subcategory has base addresses that are collected by the look-up table 45 and sent to the X-Adder 50 and Y-Adder 55 portion of the address generator 25. An address offset, based on the tracking error calculated by the gyro model 30 that is part of the T-SPIL, is communicated to the X-Adder 50 and Y-Adder 55, resulting in the modification of base addresses by the value of address offset. However, the error and calculated address offset may be determined alternatively by a separate combination of discrete systems, as is well known to those skilled in the art. In a preferred embodiment, the dual port video memory 20 receives video images from the external interface 15, may store them in a buffer (not separately shown) as necessary, and processes them while the address generator 25 selects appropriate pixels for transfer to the processor 35. Although in a preferred embodiment these images are processed serially, they may be processed in either a parallel or distributed manner. An internal counter 40 within the address generator 25 is synchronized with clock signals supplied via the external interface 15 and with the map generator 17.

The precession commands transferred by the external interface 15 are processed in the gyro model 30 to produce the center pixel prediction that is communicated to the external interface 15 for use in selecting the proper image for convolution. The gyro model 30 also venerates address offsets for transfer to the address generator 25 and a simulated gyro tilt angle signal and simulated gyro spin position reference that are communicated to an output interface 70.

The X-Adder 50 and Y-Adder 55 modify base address locations stored in the look-up table 45, incorporating the address offsets supplied by the gyro model 30. After a base address location is modified by the X-Adder 50 and the Y-Adder 55, an output value is parsed into an integer value component 160 and a fractional value component 165. The integer value component 160 is sent to the DPVM 20. The fractional value component 165 is sent to the detector response memory 90.

Using the integer value component 160 received from the X-Adder 50 and Y-Adder 55, the DPVM 20 selects a pixel from the image currently being processed. This pixel also has a value assigned to its intensity. This intensity value is multiplied in the processor 35 by the detector response value of the smallest subcategory within the response region as selected by using the fractional value provided 165 from the X-adder 50 and Y-adder 55. The individual product is then used as a value for constructing the amplitude of the detector response signal in real time. The complete image is convolved by taking the individual resultant products and summing them in the processor 35. The processor 35 then transfers the final convolution to the output interface 70.

The output interface 70 also receives the gyro positioning information, including gyro tilt angle and gyro spin position, from the gyro model 30. In a preferred embodiment of the present invention, a digital-to-analog converter (not separately shown) in communication with the output interface 70 converts the final convolution from a digital representation to an analog signal, e.g., an analog signal of voltage varying with time. A filter (not separately shown) in communication with the output interface 70 may be used to reduce any noise associated with the analog signal. Finally, the filtered analog signal is scaled to simulate an analog signal generated by an actual weapon system's detector operating in real time.

Referring now to FIG. 2 as well as FIG. 1, the method of the invention is generally shown, with the dotted lines indicating some of the devices (first shown in FIG. 1) that are performing that portion of the method. FIG. 2 is an operational flowchart 100 of the method for the convolution of images in real time for use in a simulation of the operation of a weapon system that uses an optical detector for acquisition, tracking and guidance. The order described below may vary, and should not be considered limiting.

A gyro precession command is sent 110 via the external interface 15 to gyro model 30. This enables the determination of a center scene pixel prediction that, once determined, is sent back to the external interface 15 to select the appropriate imaged scene and initiate 125 a simulation in real time. A clock signal provided 120 to the external interface 15 by a system clock (not separately shown), provides timing synchronization for the gyro model 30, the address generator 25, and the DVPM 20. Specifically, this signal synchronizes the address generator 25 and the order of the storage of images in memory and facilitates the initiation 125 of the imaged scene as a digital video image that is output to the DVPM 20, where the imaged scene may be stored 170 in a buffer together with a "time tag" provided by the clock signal.

A map of the detector's response is generated 140 off line and overlayed 135 on the digital video image during the simulation. The map is partitioned 137 into segments with pixel base addresses later synchronized 145 using the system clock and the counter 40. Each segment is assigned a pixel base address that is pre-stored 138 in the look-up table 45 from which the address generator 25 sequentially generates 150 the addresses.

An error value input facilitates calculation of an address offset that is provided to the X-Adder 50 and Y-Adder 55 of the address generator 25 by the gyro model 30. The address (generator 25 uses this address offset to provide 155 an updated response map pixel's base address that identifies where the scene pixel strikes within the area of the smallest subcategory on the response map. That is, the response map pixel's base address is combined with its address offset from the gyro model 30 to provide 157 a value for a modified response map pixel base address. This value for the modified response map pixel base address is further split into an integer component that is provided 160 to facilitate selection 175 of scene pixels stored 170 within the DVPM 20 and a fractional component that is provided 165 for selection 182 a response map value for use in overlaying 135 the correct response map area in the processor 35.

A scene pixel is selected 175 from the imaged scene that has been stored 170 in the DVPM 20. Each imaged scene is comprised of a number of scene pixels, with each scene pixel having a value associated with a base address as well as a value assigned representing its intensity. Scene pixels thus selected 175 are sent to the processor 35 where they may be stored in a buffer and multiplied by an appropriate detector response map value for purposes of constructing a simulated detector response signal.

The selected values of the response map and the selected scene pixel values are multiplied, thus, generating resultant products that are summed to generate 190 a final convolved image that corresponds to a segment of the scene overlayed by the map. The final digital convolved image for each position of the map is received 195 at the output interface 70 for further transfer. Additionally provided to the output interface 70 are gyro phase angle, gyro tilt angle, and gyro spin position as received 205 from the gyro model 30. These digital images are converted 197 to an analog signal and filtered, as necessary, to reduce noise. The filtered analog signal, e.g., one that represents voltage changes over time, is provided at the output interface 70 and may be scaled to simulate the voltage levels generated by an actual system operating in real time.

Finally, the map of the detector's signal response may be moved electronically over the complex imaged scenes in real time, thereby "flying" the weapon system in the lab to simulate an actual system in flight.

In summary, a preferred embodiment of the present invention provides a real-time detailed scene convolver that allows for correlating a complex imaged scene to the view that may be obtained with actual weapon system optical detectors, thus yielding a realistic simulation for testing in a laboratory environment, for example. Although the description above contains many specificities, these should not be construed as limited the scope of the invention but as merely providing an illustration of the presently preferred embodiment of the invention. Thus, the scope of this invention should be determined by the appended claims and their legal equivalents.

What is claimed is:

1. A system, having at least one external interface and at least one output interface, for dynamically simulating a real-time response signal of a detector viewing a scene that may be captured as at least one image composed of a first configuration of pixels, each said pixel having an intensity to which an intensity value may be assigned and a base address value that may be assigned, comprising:

a first memory in operable communication with said external interface,
   wherein said first memory may store said first configuration of pixels;

a map generator, having an input and an output, for producing at least one map representing as a second configuration of pixels said simulation of a real-time response signal, each said pixel of said second configuration of pixels having an intensity for which a intensity value may be assigned and a base address value that may be assigned, said base address values having both an integer part and a fractional part, in which either said integer and fractional part may include zero,
   wherein said map generator may operate off line, at least one second memory in operable communication with said map generator and said address generator and external to each,
   wherein said at least one second memory stores at least part of said second configuration of pixels as at least one detector response map value;

a gyro model at least in operable communication with said at least one external and said at least one output interfaces,
   wherein said gyro model establishes an error correction from which an address offset may be calculated and provides gyro position information;

an address generator that incorporates at least one first processor and at least one addressable memory for storing said base address values of said second configuration of pixels, said address generator in operable communication with said gyro model and said map generator,
   wherein at least one pixel selected from said second configuration of pixels is selected for modification of said selected pixels' said base address value, wherein said address generator receives said address offset from said gyro model, wherein said at least one first processor provides said integer part of said modified base address value of said selected pixel of said second configuration of pixels to select at least one pixel of said first configuration of pixels, and
   wherein said at least one first processor provides said fractional part of said modified base address value of said selected pixel of said second configuration of pixels to select at least one said detector response map value from said second memory;

at least one second processor in operable communication with said at least one first memory and said at least one second memory,
   wherein said second processor multiplies said intensity values for each said selected pixel from said first configuration of pixels by corresponding said intensity values for each said selected detector response value to generate at least one resultant value of pixel intensity,
   wherein said second processor sums said at least one resultant values to generate at least one convolved image, and
   wherein said at least one convolved image may be generated as a series of convolved images that move in synchronous relation to said at least one imaged scenes provided in real time to dynamically simulate said detector's response to viewing said at least one imaged scenes as they are presented; and at least one reference in operable communication with said at least one first memory, said at least one second memory, said address generator, said gyro model, said at least one second processor, and said map generator.

2. The system of claim 1, in which said reference is a clock, generating at least one clock signal, in operational communication with said at least one external interface,
   wherein said at least one external interface transfers said at least one clock signal to synchronize at least said first and second memories, said gyro model, said address generator, said at least one second processor, and said at least one map generator.

3. The system of claim 1, further comprising at least one counter that may be integral to said address generator and in operable communication with said at least one external interface that is providing said at least one clock signal.

4. The system of claim 1, further comprising at least one digital-to-analog converter for changing said at least one convolved image to at least one analog signal,
   wherein said at least one analog signal may describe voltage changes over time.

5. The system of claim 1 in which said first memory is at least one dual port video memory (DPVM).

6. The system of claim 1, in which said first processor comprises at least one X-Adder and at least one Y-adder.

7. The system of claim 1, in which said second processor is at least one digital signal processor (DSP).

8. The system of claim 7, in which said at least one DSP is at least one Super Harvard Architecture Computer.

9. The system of claim 1, in which said at least one internal addressable memory comprises a look-up table (LUT).

10. The system of claim 1, in which said at least one second memory is of a capacity sufficient to store a number of pre-calculated detector responses suitable for conducting a simulation of a pre-specified duration.

11. The system of claim 1, in which said image is a detailed image that is one of a series of images that may be stored sequentially in said first memory for use in creating a realistic simulation.

12. The system of claim 1, further comprising a model simulation of an airframe in operable communication with said address generator, said at least one external and said at least one output interfaces.

13. A method for simulating dynamic response of a detector to detailed dynamically changing scenes as said detector would be operably communicating with processing circuitry of an actual system while in actual operation, comprising:

provide at least one image, each said at least one image incorporating at least one scene pixel having an intensity to which an intensity value is assigned and a base address to which a base address value is assigned;

providing at least one map incorporating at least one response pixel, each said at least one response pixel having an intensity to which a intensity value is assigned and a base address to which a base address value, having an integer part and a fractional part, is assigned, wherein said map represents at least one pre-calculated detector signal response;

providing gyro positioning and error information from a gyro model;

time synchronizing said at least one image with said at least one map and said gyro model;

generating at least one response pixel base address modified to incorporate said positioning and error information, wherein said generation of said at least one response pixel base address modified to incorporate said positioning and error information is done in operational cooperation with said gyro model;

selecting at least one of said at least one scene pixels by using said at least one response pixel base address modified to incorporate said positioning and error information as a pointer;

selecting at least one response map value using said at least one response pixel base address modified to incorporate said positioning and error information; and convolving said intensity value of each of said at least one selected scene pixels with said at least one response map value to yield at least one convolved image, wherein said convolved image provides a digital input for a simulation of said detector's dynamic response.

14. The method of claim 13, in which generating at least one response pixel base address modified to incorporate said positioning and error information in operational cooperation with said gyro model further comprises:

communicating said positioning and error information to an address generator for processing;

calculating at least one address offset using said positioning and error information; and processing said address offset within said address generator, wherein said processing yields said at least one response pixel base address, modified to incorporate said positioning and error information.

15. The method of claim 14, further comprising parsing said at least one integer part and said at least one fractional part.

16. The method of claim 15, further comprising:

using said at least one integer part to select one of said at least one scene pixels from one of said at least one images; and using said at least one fractional part to select at least one response map value.

17. The method of claim 13, further comprising converting said at least one convolved image to an analog signal that may represent a voltage varying with time.

18. The method of claim 17, further comprising filtering said analog signal to reduce any noise that may be on said analog signal.

19. The method of claim 17, further comprising scaling said analog signal to be a realistic representation of an analog signal that may be provided by said detector during actual in-flight operation of said detector.

20. A method for convolving first and second matrices to depict a system's dynamic response to an occurrence that may change in real time, comprising:

providing at least one first matrix, each said first matrix incorporating at least one first class of elements, each element in said first class of elements having an intensity to which an intensity value is assigned and a base address to which a base address value is assigned, wherein said first matrix may represent said occurrence;

providing at least one second matrix incorporating at least one second class of elements, each element in said second class of elements having an intensity to which an intensity value is assigned and a base address to which a base address value having an integral part and a fractional part is assigned, wherein said second matrix may represent at least one pre-calculated response of said system;

providing positioning and error information from a first model; time synchronizing said at least one first matrix with said at least one second matrix and said first model;

generating at least one base address for each of said second class of elements of said second matrix, said at least one base address modified to incorporate said positioning and error information, wherein said generation of said at least one base address for each element of said second class of elements modified to incorporate said positioning and error information is done in operational cooperation with said model;

selecting at least one intensity value of said elements of said first class of elements by using said at least one base address for at least one element of said second class of elements, said base address for at least one element of said second class of elements modified to incorporate said positioning and error information as a pointer;

selecting at least one intensity value of said at least one element of said second matrix using said at least one base address for at least one element of said second class of elements modified to incorporate said positioning and error information; and convolving each of said at least one selected intensity values of elements of said first class of elements with said at least one selected intensity values of elements of said second class of elements to yield at least one convolved value, wherein said convolved value provides a digital input for a simulation of said system's dynamic response to said occurrence.

21. The method of claim 20, in which generating at least one base address for at least one element of said second class of elements modified to incorporate said positioning and error information in operational cooperation with said first model further comprises:

communicating said positioning and error information to an address generator;

calculating at least one address offset using said positioning and error information; and processing said address offset within said address generator, wherein said processing yields said at least one base address for at least one element of said second class of elements modified to incorporate said positioning and error information.

22. The method of claim 21, further comprising parsing said integer part and said fractional part of said at least one base address for at least one element of said second class of elements modified to incorporate said positioning and error information.

23. The method of claim 22, further comprising:

using said integer part of each said at least one base addresses processed in said address generator to select said intensity value of at least one element of said first class of elements; and using said fractional part of each said at least one base addresses processed in said address generator to select said intensity value of at least one element of said second class of elements.

24. The method of claim 20, further comprising converting said at least one convolved value to an analog signal that may represent a voltage varying with time.

25. The method of claim 24, further comprising filtering said analog signal to reduce any noise that may be on said analog signal.

26. The method of claim 24, further comprising scaling said analog signal to be a realistic representation of an analog signal that may be provided by said system during actual operation of said system.

27. The method of claim 20, further comprising the incorporation of at least one second model.

* * * * *